(12) United States Patent
Frefel

(10) Patent No.: US 10,590,922 B2
(45) Date of Patent: Mar. 17, 2020

(54) RECIPROCATING PISTON COMPRESSOR, A RETROFIT KIT FOR A RECIPROCATING PISTON COMPRESSOR AND THE USE OF A CONNECTING ROD IN A RECIPROCATING PISTON COMPRESSOR

(71) Applicant: HAUG Sauer Kompressoren AG, St. Gallen (CH)

(72) Inventor: Beat Frefel, Moerschwil (CH)

(73) Assignee: HAUG SAUER KOMPRESSOREN AG, St. Gallen (CH)

( * ) Notice: Subject to any disclaimer, the term of this patent is extended or adjusted under 35 U.S.C. 154(b) by 69 days.

(21) Appl. No.: 15/753,323

(22) PCT Filed: Aug. 20, 2015

(86) PCT No.: PCT/EP2015/069126
§ 371 (c)(1),
(2) Date: Feb. 18, 2018

(87) PCT Pub. No.: WO2017/028923
PCT Pub. Date: Feb. 23, 2017

(65) Prior Publication Data
US 2018/0245574 A1    Aug. 30, 2018

(51) Int. Cl.
| F02B 27/04 | (2006.01) |
| F04B 27/04 | (2006.01) |
| F04B 35/01 | (2006.01) |
| F04B 39/00 | (2006.01) |
| F04B 39/06 | (2006.01) |
| F04B 39/12 | (2006.01) |
| F16J 1/12 | (2006.01) |

(52) U.S. Cl.
CPC .......... *F04B 27/0404* (2013.01); *F04B 27/04* (2013.01); *F04B 35/01* (2013.01); *F04B 39/0022* (2013.01); *F04B 39/0094* (2013.01); *F04B 39/06* (2013.01); *F04B 39/121* (2013.01); *F04B 39/122* (2013.01); *F16J 1/12* (2013.01)

(58) Field of Classification Search
CPC ................................ F04B 27/0404; F16J 1/12
See application file for complete search history.

(56) References Cited

U.S. PATENT DOCUMENTS

| 2,014,950 | A | * | 9/1935 | Pownall | ............... F04B 27/0409 |
| | | | | | 184/27.1 |
| 2,861,851 | A | * | 11/1958 | Young | ..................... F04B 53/14 |
| | | | | | 92/244 |
| 3,849,652 | A | * | 11/1974 | Dix | .......................... F25B 9/14 |
| | | | | | 250/352 |

(Continued)

FOREIGN PATENT DOCUMENTS

| CN | 202 391 677 U | 8/2012 |
| DE | 2 032 434 A1 | 1/1971 |

(Continued)

*Primary Examiner* — Thomas E Lazo
(74) *Attorney, Agent, or Firm* — McGlew and Tuttle, P.C.

(57) ABSTRACT

A reciprocating piston compressor (100) includes a crank casing (10). The reciprocating piston compressor (100) includes a crankshaft (11), a piston rod (12) and a crosshead (13). The crosshead (13) and the piston (23) are actively connected to one another by way of a connecting rod (24). The connecting rod (24) is fixedly restrained on the crosshead (13) and on the piston (23).

20 Claims, 2 Drawing Sheets

(56) References Cited

U.S. PATENT DOCUMENTS

| | | | | |
|---|---|---|---|---|
| 5,161,928 A | * | 11/1992 | Burdick, Jr. ............ | F16B 9/026 403/371 |
| 5,467,687 A | * | 11/1995 | Habegger ........... | F04B 39/0022 92/165 R |
| 7,357,068 B2 | * | 4/2008 | Barbezat ............... | C04B 35/119 92/170.1 |
| 2015/0075368 A1 | * | 3/2015 | Koontz ..................... | F16J 1/12 92/138 |

FOREIGN PATENT DOCUMENTS

| | | | |
|---|---|---|---|
| JP | 2006 220074 A | | 8/2006 |
| JP | 2012 036813 A | | 2/2012 |
| JP | 2012036813 A | * | 2/2012 |
| WO | 98/31936 A1 | | 7/1998 |

\* cited by examiner

RECIPROCATING PISTON COMPRESSOR, A RETROFIT KIT FOR A RECIPROCATING PISTON COMPRESSOR AND THE USE OF A CONNECTING ROD IN A RECIPROCATING PISTON COMPRESSOR

CROSS REFERENCE TO RELATED APPLICATIONS

This application is a United States National Phase Application of International Application PCT/EP2015/069126, filed Aug. 20, 2015, the entire contents of which are incorporated herein by reference.

FIELD OF THE INVENTION

The present invention relates to a reciprocating piston compressor, to a retrofit kit for a reciprocating piston compressor and to using a fixedly restrained connecting rod in a reciprocating piston compressor

BACKGROUND OF THE INVENTION

Different types of reciprocating piston compressors are known from the state of the art. A reciprocating piston compressor according to the Scotch yoke principle/cross-crank principle is known for example from WO 98/31936. This piston compressor in its casing comprises a crankshaft which moves a yoke up and down. A connecting rod is arranged between the yoke and the compressor piston. The connecting rod is articulately connected to the yoke and to the piston. At its ends, it comprises parts of ball surfaces which permit a rolling movement of the connecting rod on the yoke and on the piston. A reciprocating piston compressor according to the Scotch yoke principle is likewise known from DE 2 032 434. Herein, the skirt of the piston is restrained on a guide piston with a sleeve.

This device demands much effort on manufacture and the implementation in the case of small geometries is complicated.

SUMMARY OF THE INVENTION

It is an object of the invention to avoid the disadvantages of that which is known and in particular to provide a simple, low-maintenance and inexpensive connecting rod for the connection of a piston of a reciprocating piston compressor to a crosshead of a reciprocating piston compressor. In particular, a connecting rod for use in a piston compressor with a conventional crank drive is to be provided.

The reciprocating piston compressor according to the invention comprises a crank casing. The reciprocating piston compressor comprises a crankshaft and, arranged on this, at least one piston rod (conrod). The piston rod interacts with a crosshead. The crosshead is configured as a guide piston. Typically, the piston rod is articulately connected to the crosshead. The reciprocating piston compressor comprises at least one cylinder and a piston which is movably arranged in the cylinder. The crosshead and the piston are interactively connected to one another by way of a connecting rod. The connecting rod is connected to the crosshead with a first fixed restraint (clamping or fixation) and to the piston with a second fixed restraint.

The crosshead is a coupling link between the essentially linearly moved connecting rod and the piston rod, wherein the crosshead eliminates the pivoting movement of the piston rod. The movements remaining above the crosshead are essentially only linear.

Here and hereinafter, above means in the direction of the compression chamber of the piston and below means in the direction of the crankshaft or of the crank casing.

A fixed restraint here means that a connection with the degree of freedom f=0 is created.

A fixed restraint on the crosshead and a fixed restraint on the piston permits the creation of a connection which is without play. Such a connection is moreover simple to manufacture and the number of different parts remains low.

Herewith, the connecting rod can be configured such that it permits alignment errors between the crosshead and piston given minimal piston transverse forces.

The restraint at the piston side is preferably located within the piston, preferably in the center of gravity of the piston and particularly preferably in the lower third of the piston which faces the crankshaft.

With this, the lateral forces can be accommodated above and below the restraint. The progression of the force at the restraint is advantageous.

In particular, one can envisage designing the at least one fixed restraint as a press fit. Alternatively, for example screwed connections can also be considered.

Concerning a press fit, the restraint is preferably configured such that a cylindrical receiver of the fit has a length-to-diameter ratio of 1.5:1, preferably of 2:1 and particularly preferably of at least 2.5:1. A stable connection can be created with this.

However, at least one of the restraints can also be configured with a thread. Herein, it is conceivable to provide an outer thread on the connecting rod in each case. Thereby, the piston or crosshead comprises a blind hole with a corresponding inner thread. However, it is also conceivable to provide the blind hole on the connecting rod and to therefore swap the outer thread and inner thread.

The connecting rod can comprise a first connecting region for the crosshead and a second connecting region for the piston.

The connecting region permits a shaping of the connecting rod which is matched to the respective component (piston/crosshead).

Between the first connecting region and the second connecting region, the connecting rod can comprise a section which has a constant cross section (hereinafter called middle section).

A connecting rod which between the connecting regions has characteristics which differ from the characteristics of the connecting regions can be created with this. Herein, the cross section can be selected such that for example defined deformations can occur in the middle section. By way of this, it is likewise possible to relieve the connecting regions in the case of damage or given an excessive loading of the complete compressor.

At least one of the two connecting regions can comprise a region with a reduced cross section for forming a solid joint.

Herein, the connecting region can be configured as an integrally formed region in accordance with the preconditions for connection to the piston or to the crosshead. A cross-sectional reduction is this region or directly connecting to this region, for example between this region and the middle section permits an elastic bending or an elastic buckling and/or an angular change between the middle section and the respective connecting region.

Positional accuracies or angular tolerances for example can be compensated by this. Amongst other things, positional inaccuracies can arise due to the crosshead being worn down, wherein it is particularly the guiding regions of the crosshead which can have a certain wearing over the course of time.

It is therefore likewise possible, regarding the deformation and strength, to decouple the section between the connecting regions, thus the middle section, from the connecting regions. Herein, it is possible to design this middle region essentially independently of the connecting regions.

The connecting regions are preferably computed amid the application of computer-assisted methods, such as the finite element method, wherein all geometries and loads can be taken into account.

Given the design of the connecting rod without a cross-sectional reduction in the connecting regions and given a loading of the connecting rod in the longitudinal direction in the installed condition, the buckling case according to Euler 4 results, given a cross-sectional reduction in a connecting region a buckling case according to Euler 3 and given a cross-sectional reduction in both connecting regions a buckling case according to Euler 2.

The crosshead is preferably configured as a guide piston, which means that driven by a piston rod it moves up and down within a cylindrical bore or is movable up and down. The guide piston preferably has a ratio of diameter to length which is 1 to 1. The crosshead preferably has a length which is larger than the diameter.

This likewise permits a favorable force distribution and lateral forces are reduced.

The connecting rod preferably has a diameter and a length which are dimensioned in a manner such that a transverse force which results from a maximal deviation of the first restraint vis-à-vis the second restraint transversely to a central axis of the cylinder does not exceed a predefined limit transverse force. The deflection is maximally 3% of a piston diameter and/or preferably maximally 0.5 mm. The resulting limit transverse force is maximally 1/200 of a piston force and preferably does not exceed 20 Newton. The piston force is the force which acts upon the piston base on operation according to the invention.

Herein, for example the crosshead and the piston and accordingly also the respective restraints can have a likewise central axis which is collinear or essentially collinear to the axis of the cylinder.

Herein, deviations of the collinearity which arise for example due to manufacturing errors and assembly inaccuracies or by way of wear and use, or alignment errors can occur. These deviations (deflections) can occur for example between the piston axis and first restraint, the first or second restraint and/or between the second restraint and crosshead. A combination or superimposition of such displacements/deviations is likewise possible.

A combination of all deviations should be maximally 3% of the piston diameter. Herein, a transverse force which should not exceed the previously mentioned limit value arises.

The diameter and length of the piston rod are therefore selected such that minimal constraints are kept to. A final computation of the forces is easily possible. Information concerning the expected service life can be provided by this. One can likewise determine when for example an overhaul or an exchange of wearing parts becomes necessary.

The cylinder of the reciprocating piston compressor can comprise a guide section and a compression section. This permits the manufacture of the cylinder for example with different surface qualities and/or differing characteristics for the respective section.

The compression section can be constructed in a multi-part manner, wherein the compression section preferably comprises a cylinder head, a middle part and a cylinder base.

This on the one hand permits a manufacture of a compression section with for example different characteristics for the respective region. It is likewise possible to exchange only individual parts when a respective wearing occurs. The relatively large tolerances which are possible with a connecting rod as is present permit the compression section to be manufactured in a multi-part manner. The total tolerances increase with each additional element which must be manufactured. The presently described connecting rod permits the compensation of such tolerance errors to a high degree.

The middle part of the compression section can comprise a cylinder liner or simply liner.

Desired sliding (antifriction) characteristics in the compression section can be additionally adjusted by way of this. An antifriction layer can likewise be provided between the piston and cylinder for reducing the friction. An antifriction layer can likewise be provided for the reduction of the friction between the crosshead and the cylinder. A guide ring can be provided as an alternative to an antifriction layer on the crosshead. The respective antifriction layer can herein be brought on the piston or on the crosshead or on the respective region of the cylinder. This permits the reduction of friction forces. This is particularly advantageous with piston compressors which are designed as oil-free, dry-running compressors.

The wearing on the piston and/or on the cylinder and/or on the crosshead is reduced by way of suitable antifriction layers.

The reciprocating piston compressor can be cooled by air or water. Different fields of application therefore become possible.

The reciprocating piston compressor is preferably dry-running Here, dry-running means that at least neither the piston nor the guide piston is lubricated. This means that the compressor is without oil in these regions. The compressor is preferably completely dry-running, which means is completely oil-free. This means that the compressor is likewise not lubricated in the region of the crankshaft and of the piston rod bearings. The dimensioning of the connecting rod permits the diameter of the piston and cylinder to be matched to one another within a very narrow range, without an additional lubrication being necessary in order to keep the wearing and/or lateral/transverse forces to a minimum.

Alternatively, oil lubrication can likewise be envisaged—this however merely being the case for example if no particular demands are placed upon the cleanliness of the medium to be compressed.

A dry-running compressor permits a compressing process without the process gas yet having to be filtered or purified after the compressing or, in comparison to compressors running in a lubricated manner, the share of contaminating particles in the process gas being significantly reduced.

A further aspect of the invention relates to a retrofit kit for a reciprocating piston compressor, preferably for a reciprocating piston compressor as described here. The retrofit kit comprises a piston rod, a crosshead, a piston as well as a connecting rod. The crosshead and the piston can be brought into active connection with one another by way of the connecting rod. The crosshead and the piston are connected or are connectable to the connecting rod with a fixed restraint. The crosshead and the piston preferably each comprise a receiver for the fixed restraining or clamping of the connecting rod.

This permits the reconfiguration of existing reciprocating piston compressors. It is likewise possible to replace worn parts of conventional reciprocating piston compressors by parts from the retrofit kit and thus to uniformly upgrade the reciprocating piston compressor in the case of a service or overhaul.

One can envisage providing a complete cylinder additionally to the retrofit kit. The cylinder can thereby consist of several individual parts as described here.

Compared to the state of the art for example, a reduction of the diameter of the piston which compresses the process gas or the medium to be compressed is rendered possible by making do without additional individual parts for connecting the individual elements. The number of fastening parts is reduced with a fixedly restrained connecting rod. A fixed connection to the piston can also be created given very small cross sections.

A reciprocating piston compressor and/or an arrangement of a piston, crosshead and connecting rod as described here is particularly advantageous on compressing process gas such as air, nitrogen, oxygen, carbon dioxide, carbon monoxide, natural gas, hydrogen, refrigerant gases, SF6 mixtures, helium and other inert gases, particularly with high-pressure applications. Such reciprocating piston compressors can be constructed in a multi-stage manner.

The invention is hereinafter described in detail by way of embodiment examples. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
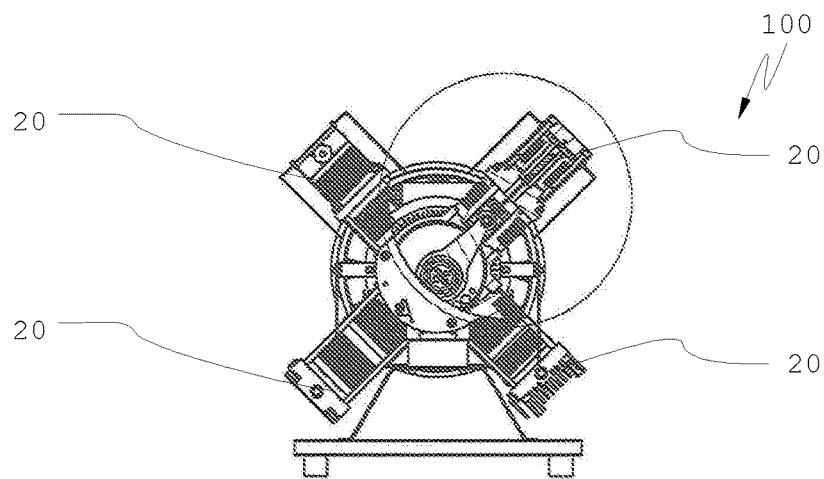
FIG. 1 is a partially sectional view of a reciprocating piston compressor according to the invention with four cylinders.

Referring to the drawings, FIG. 1 shows a reciprocating piston compressor 100. The reciprocating piston compressor 100 here comprises four cylinders 20, in which a piston is located in each case. The reciprocating piston compressor 100 is designed as a multi-stage piston compressor.

Figure 2:
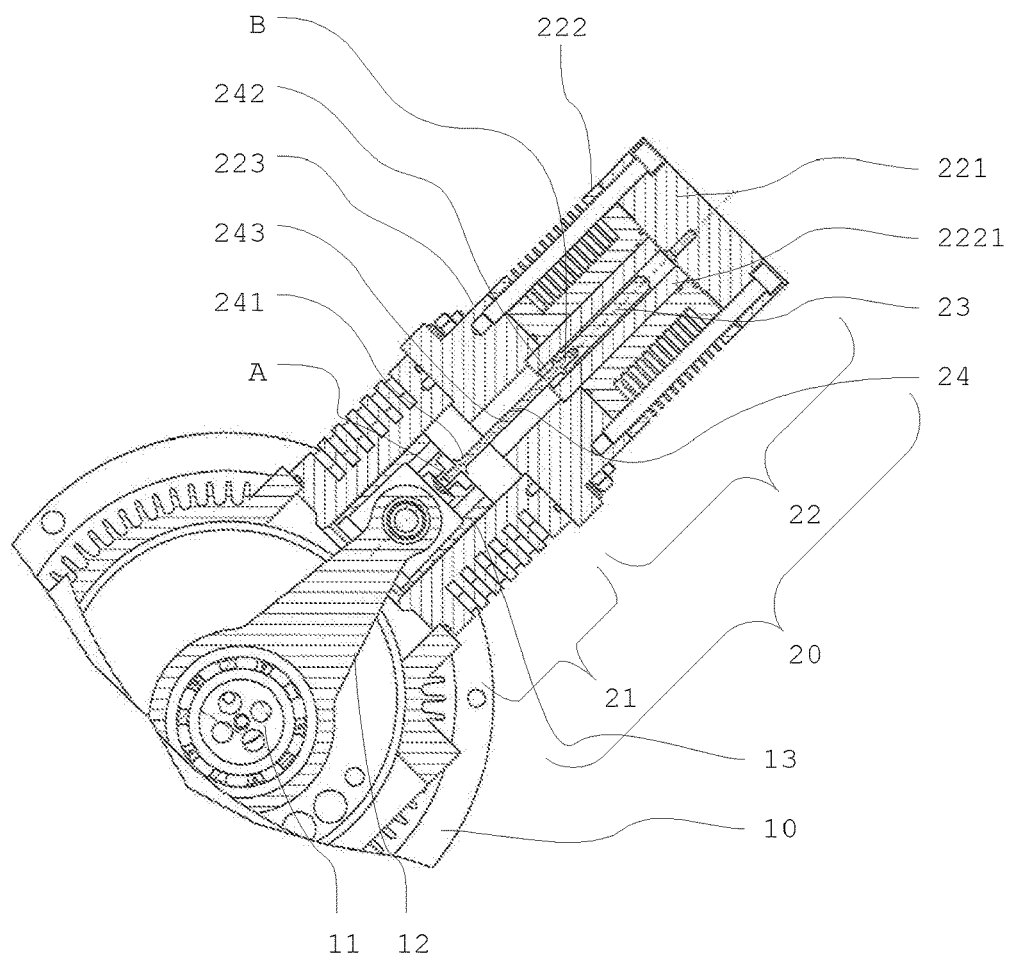
FIG. 2 is a sectioned detail view from FIG. 1.

FIG. 2 shows a detail of the reciprocating piston compressor 100 of FIG. 1. What is shown is a sectioned view through the high pressure stage of the reciprocating piston compressor 100 of FIG. 1.

A crankshaft 11, on which a piston rod 12 is pivotally mounted is arranged in a crank casing 10. The piston rod 12 is connected to a crosshead 13. The connection between the piston rod 12 and crosshead 13 is configured as an articulated bolt connection. Suitable bearings are provided on the connection (not described in more detail here). The crosshead 13 is configured as a piston with a round cross section. An opening, in which a connecting rod 24 is retrained or clamped with a restraint A is located at the top on the crosshead 13. The connecting rod 24 is likewise fixedly retrained on a piston 23 with the restraint B. The piston 23 likewise comprises a suitable opening. Connecting regions 241 and 242 are provided on both sides of the connecting rod 24. The connecting regions 241 and 242 merge into a foot which is to say that they have a thickened cross section and a cross section which becomes thicker, in the region of the connection to the piston and to the crosshead respectively. Here, the restraint A and B are configured as press fits. The connecting rod comprises a middle section 243 between the restraint A and B, which is to say likewise between the connecting regions 241 and 242. This middle section 243 is reduced in diameter in comparison to the sections 241 and 242.

The cylinder 20 is subdivided into a guide section 21 and into a compression section 22. The guide section 21 is configured as one piece. The crosshead 13 is located in this. The compression section 22 here is configured in a three-part manner. It comprises a cylinder head 221, a middle part 222 and a cylinder base 223. A cylinder liner 2221 which extends to into the cylinder base 223 is arranged within the middle part 222. The cylinder liner 2221 here is manufactured of high-alloy nickel steel. Carbide or a high-strength plastic can be used as an alternative. The materials preferably have a thermal coefficient of expansion of zero or approximately zero and are wear-resistant. The same materials are preferably applied for the piston 23. The cylinder head 221, the middle part 222 and the cylinder base 223 are restrained or tensioned to one another by way of screws. The middle part 222 comprises cooling ribs which serve for dissipating heat to the surroundings.

The piston 23 runs up and down within the piston liner 2221 and comprises an antifriction layer for reducing the friction. The antifriction layer is of a high-strength, reinforced plastic, here PEEK. PTFE with carbon fibers could be used as an alternative. Here, the connecting rod 24 is configured in a manner such that given a loading of the position from the direction of the compression chamber, a buckling according to Euler 4 occurs. It consists of a high-strength Q&T steel, but titanium or titanium alloys would also be conceivable. The crosshead 13, the piston rod 12 and the guide section 21 here are manufactured of aluminum. Titanium and its alloys as well as steel can however be envisaged.

Figure 3A:
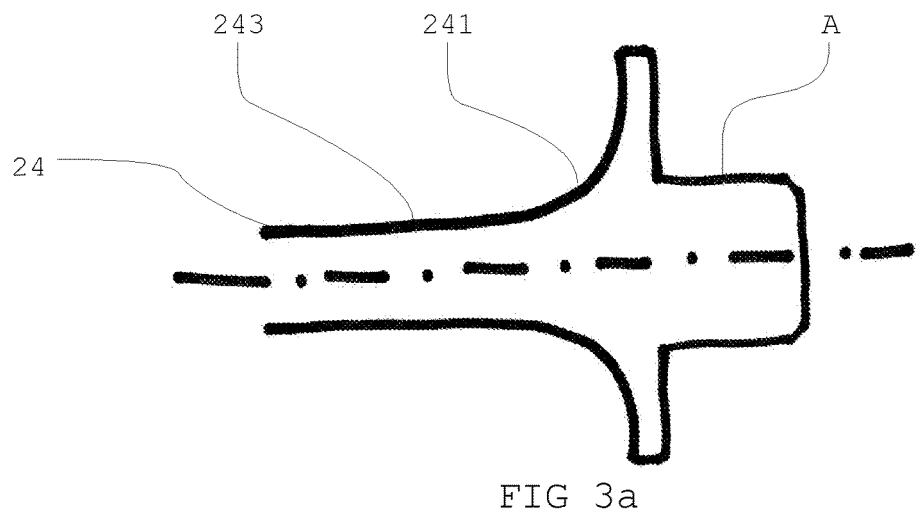
FIG. 3a is a schematic view showing a detail of a connecting rod.

One end of the connecting rod 24 of FIG. 2 is shown in FIG. 3a. It comprises a region for the restraint A, a connecting region 241 and a middle section 243. The diameter of the connecting rod 24 is essentially constant in the middle section 243. This connecting rod in the connecting region 241 thickens into a foot, on which a pin the restraint A is subsequently provided. The cross section of the connecting region 241 constantly increases in the direction to the restraint A.

Figure 3B:
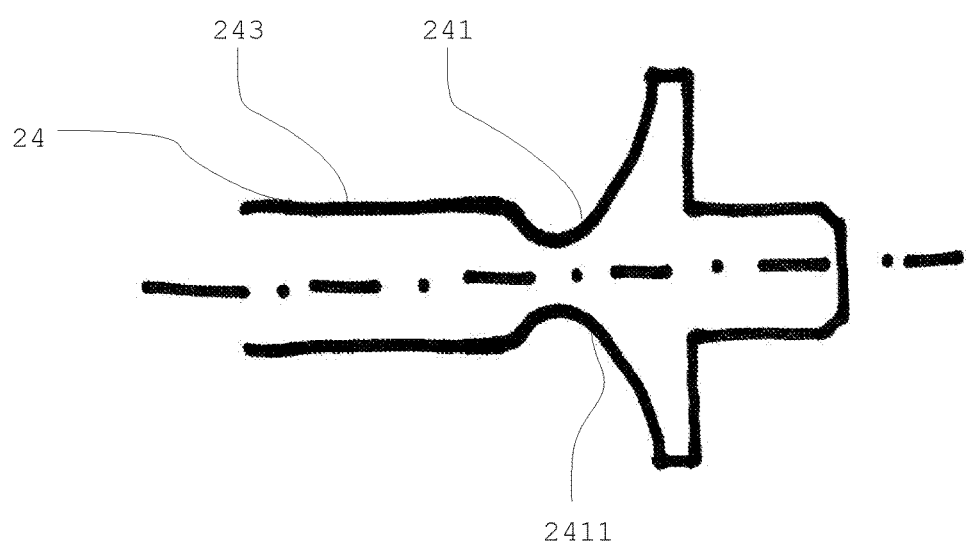
FIG. 3b is a schematic view showing a detail of a connecting rod.

In contrast to this and merely for comparison, the connecting rod of FIG. 3a is shown in FIG. 3b, wherein the connecting rod comprises a connecting region 241 with a cross-sectional narrowing 2411. This narrowing is configured in a peripheral manner and forms a solid joint. Here, the narrowing 2411 is located between the middle section 243 and the connecting region 241, and forms the termination of the connecting region 241 towards the middle section 243. The same embodiments likewise apply to the restraint B and the associated connecting region 242.

Figure 4:
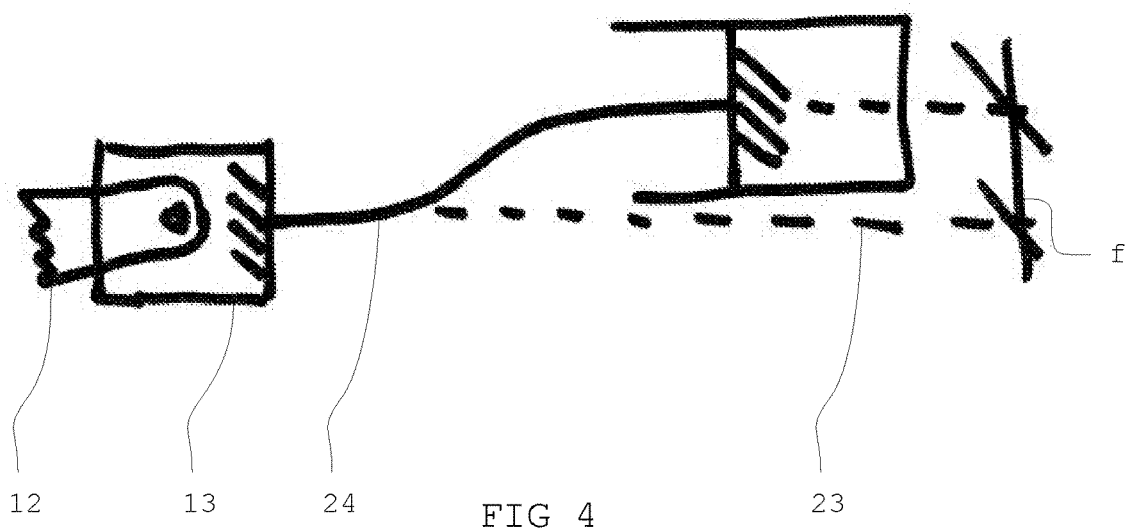
FIG. 4 is a schematic view showing a connecting rod.

FIG. 4 schematically shows a connecting rod 24, restrained in a piston 23 and a crosshead 13. An offset f which can arise for example on account of manufacturing tolerances is present between the central axes of the crosshead 13 and the piston 23. The offset f however can also set in over the course of time. For example, a guide portion at the crosshead can wear. This danger increases for example in the case of a dry-running, oil-free piston compressor.

An exemplary computation of the connecting rod for different diameters and piston pressures (piston forces) is shown in the subsequent table. Herein, a material with a reverse bending strength of $\sigma=420$ N/mm$^2$, a yield strength Re of 900 N/mm$^2$, a modulus of elasticity of 210 kN/mm$^2$ and a maximal possible offset f of 0.5 mm is assumed. A specific slenderness ratio limit can be computed for specific material constants. The slenderness ratio limit is 66 for the present material. The buckling according to Tetmajer, i.e. plastically must be computed below this slenderness ratio limit and according to Euler, i.e. elastically, above this slenderness ratio limit.

The computations were effected for the Euler cases 3 and 4 amid the specification of a constant, maximally permissible transverse force, i.e. a transverse force which does not exceed an absolute valve. In a second step, the maximally permissible transverse force was computed on a percentage basis depending on the piston force and this value was taken a basis.

Herein, the computations were carried out for piston forces F=4 kn, 8 kn and 12 kN. On the one hand the transverse force Q was limited to 20 N for all piston forces and on the other hand it was proportionally (F/200) included in the calculations.

Herein, a safety of 4 of the $\sigma$_buckling to $\sigma$_compressive should not be fallen short of.

The calculations could all be carried out according to Tetmajer. The following diameters D, lengths L and slenderness ratios X, could be iteratively determined.

The stresses were computed in the following table, wherein both connecting regions of the connecting rod 24 according to FIG. 3a are specified.

|   | Euler 4 transverse force limited on a percentage basis | | | | Euler 4 transverse force limited in an absolute manner | | |
|---|---|---|---|---|---|---|---|
| F | 4000 | 8000 | 12000 | [N] | 4000 | 8000 | 12000 |
| Q | 20 | 40 | 60 | [N] | 20 | 20 | 20 |
| L | 160 | 192 | 215 | [mm] | 160 | 269 | 367 |
| D | 6 | 8.2 | 9.9 | [mm] | 6 | 8.9 | 11.2 |
| λ | 53 | 47 | 43 | [—] | 53 | 60 | 66 |
| $\sigma$_buckling | 559 | 601 | 622 | [N/mm^2] | 559 | 514 | 481 |
| $\sigma$_compressive | 141 | 151 | 156 | [N/mm^2] | 141 | 129 | 122 |
| S | 4 | 4 | 4 | [—] | 4 | 4 | 4 |

In the following table, the stresses have been computed under the assumption that the connecting rod 24 at one side comprises a connecting region according to FIG. 3a and at the other side a connecting region according to FIG. 3b (solid joint).

|   | Euler 3 transverse force limited on a percentage basis | | | | Euler 3 transverse force limited in an absolute manner | | |
|---|---|---|---|---|---|---|---|
| F_piston | 4000 | 8000 | 12000 | [N] | 4000 | 8000 | 12000 |
| Q | 20 | 40 | 60 | [N] | 20 | 20 | 20 |
| L | 95 | 117 | 130 | [mm] | 95 | 160 | 214 |
| D | 5.8 | 8 | 9.6 | [mm] | 5.8 | 8.5 | 10.6 |
| λ | 46 | 41 | 38 | [—] | 46 | 53 | 57 |
| $\sigma$_buckling | 607 | 638 | 658 | [N/mm^2] | 607 | 563 | 539 |
| $\sigma$_compressive | 151 | 159 | 166 | [N/mm^2] | 151 | 141 | 136 |
| S | 4 | 4 | 4 | [—] | 4 | 4 | 4 |

Given the selected values of L and D, a safety S of at least 4 resulted whilst taking into account the present stress σ_compressive and the critical buckling stress σ_buckling. The computations can of course also be calculated on the basis of a defined, demanded or desired safety value.

While specific embodiments of the invention have been shown and described in detail to illustrate the application of the principles of the invention, it will be understood that the invention may be embodied otherwise without departing from such principles.

The invention claimed is:

1. A reciprocating piston compressor comprising:
a crank casing;
a crankshaft;
at least one piston rod arranged on the crankshaft;
a crosshead configured as a guide piston, the piston rod being actively connected to the crosshead;
at least one cylinder;
a piston movably arranged in the cylinder;
a connecting rod, wherein the crosshead and the piston are actively connected to one another by way of the connecting rod, wherein the connecting rod is connected to the crosshead with a first fixed restraint and the connecting rod is connected to the piston with a second fixed restraint, the connecting rod being configured such the connecting rod permits alignment errors between the crosshead and the piston via one of deformation of the connecting rod and deflection of the connecting rod.

2. A reciprocating piston compressor according to claim 1, wherein at least one of the first and second fixed restraints is configured as a press fit.

3. A reciprocating piston compressor according to claim 1, wherein the connecting rod comprises a first connecting region for the crosshead and a second connecting region for the piston.

4. A reciprocating piston compressor according to claim 3, wherein the connecting rod between the first connecting region and the second connecting region comprises a section with a constant cross section.

5. A reciprocating piston compressor according to claim 3, wherein at least one of the connecting regions comprises a region with a reduced cross section for forming a solid joint.

6. A reciprocating piston compressor according to claim 1, wherein the connecting rod has a diameter and a length which are dimensioned such that a transverse force which results from a deviation of the axis of the first fixed restraint with respect to the axis of the second fixed restraint does not exceed a limit transverse force, wherein the deflection is maximally 3% of a piston diameter.

7. A reciprocating piston compressor according claim 6, wherein the limit transverse force does not exceed 20 N.

8. A reciprocating piston compressor according to claim 1, wherein the cylinder comprises a guide section and a compression section.

9. A reciprocating piston compressor according to claim 8, wherein the compression section is constructed with multiple parts comprising a cylinder head, a middle part and a cylinder base.

10. A reciprocating piston compressor according to claim 9, wherein the middle part is constructed with multiple parts and comprises a cylinder liner.

11. A reciprocating piston compressor according to claim 1, wherein the reciprocating piston compressor is air-cooled.

12. A reciprocating piston compressor according to claim 1, wherein the reciprocating piston compressor is water-cooled.

13. A reciprocating piston compressor according to claim 1, wherein the reciprocating piston compressor is dry-running.

14. A reciprocating piston compressor according claim 1, wherein the connecting rod has a diameter and a length which are dimensioned such that a transverse force which results from a deviation of the axis of the first fixed restraint with respect to the axis of the second fixed restraint does not exceed a limit transverse force, wherein the deflection does not exceed 0.5 mm when the limit transverse force is maximally $\frac{1}{200}$ of a piston force F.

15. A reciprocating piston compressor according claim 14, wherein the limit transverse force does not exceed 20 N.

16. A retrofit kit for a reciprocating piston compressor comprising a piston rod, a crosshead, a piston and a connecting rod, wherein the crosshead and the piston can be brought into active connection with one another by way of the connecting rod, wherein the crosshead and the piston each comprise a receiver for a fixed restraining of the connecting rod, the connecting rod being configured such the connecting rod permits alignment errors between the crosshead and the piston via one of deformation of the connecting rod and deflection of the connecting rod.

17. A retrofit kit according to claim 16, further comprising a cylinder, wherein the cylinder preferably comprises a guide section and a compression section.

18. A reciprocating piston compressor comprising:
a crank casing;
a crankshaft;
at least one piston rod arranged on the crankshaft;
a crosshead configured as a guide piston, the piston rod being actively connected to the crosshead;
at least one cylinder;
a piston movably arranged in the cylinder;
a one-piece integrally formed connecting rod, wherein the crosshead and the piston are actively connected to one another via the one-piece integrally formed connecting rod, wherein the connecting rod is connected to the crosshead with a first fixed restraint and the connecting rod is connected to the piston with a second fixed restraint, the one-piece integrally formed connecting rod comprising a one-piece integrally formed connecting rod extent extending between an end of the piston and an end of the crosshead, wherein only a portion of the at least one cylinder surrounds the one-piece integrally formed connecting rod extent, wherein no other structure is provided radially between the one-piece integrally formed connecting rod extent and an inner surface of the at least one cylinder with respect to a longitudinal axis of the at least one cylinder.

19. A reciprocating piston compressor according to claim 18, wherein the connecting rod is configured such the connecting rod permits alignment errors between the crosshead and the piston via one of deformation of the connecting rod and deflection of the connecting rod.

20. A reciprocating piston compressor according to claim 18, wherein the connecting rod has a diameter and a length which are dimensioned such that a transverse force which results from a deviation of the axis of the first fixed restraint with respect to the axis of the second fixed restraint does not exceed a limit transverse force, wherein the deflection of the connecting rod is maximally 3% of a piston diameter.

* * * * *